United States Patent [19]

Slaugh et al.

[11] 4,326,992

[45] Apr. 27, 1982

[54] PROCESS FOR PREPARING A SUPPORTED MOLYBDENUM CARBIDE COMPOSITION

[75] Inventors: Lynn H. Slaugh; Ronald J. Hoxmeier, both of Houston, Tex.

[73] Assignee: Shell Oil Company, Houston, Tex.

[21] Appl. No.: 213,972

[22] Filed: Dec. 8, 1980

[51] Int. Cl.$^3$ .......................... B01J 23/28; B01J 27/22
[52] U.S. Cl. .................................................... 252/443
[58] Field of Search ........................................ 252/443

[56] References Cited

U.S. PATENT DOCUMENTS 4,073,866  10/1976  Yamaki et al. .................. 252/443 X

*Primary Examiner*—W. J. Shine

[57] ABSTRACT

A process for preparing a supported molybdenum carbide composition which comprises impregnating a porous support with a solution of molybdic acid dissolved in aqueous ammonium hydroxide, drying the impregnated support and then heating in a carbiding atmosphere at a temperature of about 650°–750° C.

4 Claims, No Drawings

PROCESS FOR PREPARING A SUPPORTED MOLYBDENUM CARBIDE COMPOSITION

FIELD OF THE INVENTION

This invention relates to a process for preparing supported molybdenum carbide compositions useful as catalysts.

BACKGROUND OF THE INVENTION

Transition metal carbides are intriguing materials, some of which have been of industrial interest for a hundred years. It is surprising that the catalytic properties of these materials have been so relatively little investigated. These compounds possess attributes which suggest that they should be valuable catalysts. One would anticipate catalytic activity, since for example carbides behave as metals with the properties enhanced by the addition of carbon. They are electrical conductors and their high degree of chemical inertness should allow them to be used as catalysts under hostile conditions. They have unusually high thermal stabilities and one should be able to use them at very high temperatures without catalyst deactivation due to sintering. The relatively small amount of investigative work performed on the molybdenum carbide for use as catalysts has been performed on bulk materials. Activities have typically been low. It might be expected that if molybdenum carbide were to be supported on a high surface area support, much more interesting catalytic properties would be observed. A method that would provide for a supported molybdenum carbide catalyst which would retain high surface areas would be very useful in the catalytic arts.

SUMMARY OF THE INVENTION

The instant process provides for a method for preparing supported molybdenum carbide compositions which retain a significant proportion of the surface area of the underlying support. These high surface area supported materials are useful as catalysts. Basically, the method comprises impregnating a porous inert support with a solution of molybdic acid dissolved in an aqueous ammonium hydroxide solution, heating the impregnated support to remove the solvent and subsequently heating to about 650°–750° C. in a carbiding gas mixture comprising hydrogen, lower alkane, alkene or carbon monoxide and a noble gas. The instant process is a relatively mild process which retains a substantial amount of the surface area of the underlying support. The carbiding temperature range is critical to maintain high surface area.

DESCRIPTION OF THE ILLUSTRATIVE EMBODIMENTS

The supports utilized in the preparation of the compositions of this invention are in their broadest aspects selected from the large number of conventional, porous, refractory catalyst carriers or support materials. These materials should not degrade substantially when subjected to the composition preparative techniques of the instant invention. They should not, for example, react with the impregnating solution nor substantially sinter when heated to the carbiding temperature nor react substantially with the carbiding gas. When the supported materials are used as catalysts it is important that the catalyst support also be essentially inert to the reactant products and reactant conditions. Such conventional support materials may be of natural or synthetic origin. Very suitable supports comprise those of aluminous, siliceous or carbonaceous composition. Specific examples of suitable supports are aluminum oxide, charcoal, graphite, pumice, magnesia, zirconia, kieselguhr, silica, silica-alumina, selected clays, artificial and natural zeolites and ceramics. Refractory supports particularly useful in the preparation of the composition of this invention comprise the aluminas, aluminous materials, the silicas and siliceous material and carbonaceous materials. Gamma alumina, silica and activated carbon are particularly useful. The supports may be shaped into particles, chunks, pieces, pellets, rings, spheres, and the like. Prior to use the catalyst support materials are typically calcined at sufficiently high temperatures to remove free water. These conditions of calcination will depend on the particular material involved.

In order to impregnate the support material a solution of molybdic acid is prepared by dissolving the molybdic acid in an aqueous ammonium hydroxide solution. Dissolution of the molybdic acid ($H_2MoO_4$ or $MoO_3.H_2O$) in ammonium hydroxide results in a solution of ammonium meta-molybdenate. The use of ammonium meta-molybdenate directly is considered herein as equivalent to the use of molybdic acid and ammonium hydroxide. The actual impregnation techniques utilized are conventional in the catalytic art and, for example, include the so-called "dry-impregnation" wherein sufficient amount of liquid is utilized to just wet a catalyst support material, Other methods would include the use of excess liquid material, with subsequent removal of this excess by, for example, centrifugation.

After impregnation the impregnated material is dried in order to remove the solvent. The drying conditions typically utilized range from about 100°–250° C., preferably from about 150° to about 200° C. Drying may take place in air as for example with the utilization of a vacuum drying oven or by flowing hot dry gas over the material. After drying, the impregnated support may optionally be calcined at temperatures ranging up to about 700° C. prior to carbiding. The calcining atmosphere may be reducing, neutral or oxidizing. After calcining the molybdenum will be present on the support as molybdenum oxide, aluminum molybdenate and/or molybdenum metal depending on whether the calcining atmosphere is oxidizing or reducing. The particular state of the molybdenum prior to carbiding is not critical to this invention.

After drying, the impregnated material is heated at a temperature ranging from about 650° C. to about 750° C. in a carbiding gas. The time at this temperature will be dependent on the temperature utilized. Higher temperature will require shorter time and vice versa. At a given temperature the appropriate time is readily determined by routine experimentation and analysis. Typically the time will range from about 0.01 to about 10 hours and must be sufficient to convert substantially all of the molybdenum metal and molybdenum oxides into molybdenum carbides.

The carbiding gas comprises basically hydrogen and a carbiding component with the balance being a noble gas. The concentration of hydrogen will range from about 1 to about 20% by volume. The concentration of the carbiding component will range from about 0.5 to about 5% by volume (gaseous state). The carbiding component will be selected from the group consisting of lower alkane, lower alkene, carbon monoxide and mixtures thereof. The carbon numbers of the lower alkanes and alkenes utilized range from about 1 to about 3. Thus, methane, ethane, propane, ethylene, and propylene, are utilized. Methane is a preferred gas. The noble gases used to dilute the hydrogen and alkane or alkene mixtures are selected from .VIIIA of the periodic table and include helium, neon, argon, krypton and xenon. Argon is a preferred noble gas to be utilized.

DESCRIPTION OF THE ILLUSTRATIVE EMBODIMENTS

The following example illustrates preparations of catalysts by a process of the instant invention.

Kaiser KA-201 Alumina of 5/8" diameter balls was ground and sized to 18×30 U.S. Sieves. The 16×30 granular aluminum was rolled with an equal volume of water for 16 hours to smooth the granules, making them more resistant to abrasion during further handling. The wet material was dried, resieved to 18×30 mesh and redried before using.

To prepare a catalyst containing about 30% by weight of molybdenum, 112 grams of molybdic acid (85.5% $MoO_3$, Baker) was dissolved in a solution of 75 cc concentrated ammonium hydroxide and 170 cc distilled water. This solution was poured over 155 grams of the above 18×30 mesh KA-201 alumina contained in a glass fritted Buchner funnel. The mixture was allowed to stand 2 minutes and then drained well. The Buchner funnel and the contents were dried for several hours at 145° C. in a vacuum oven which partially decomposed the ammonium meta-molbdenate to $MoO_3$. The above impregnation was repeated three more times, using the recovered solution in each case. The last of these repeats was done in a beaker to get better mixing. Finally, the resultant dried composition was calcined in air for about 1 hour at about 400° C.

To prepare lower weight loadings of catalysts (approximately 10% by weight of molybdenum), 17.9 grams of molybdic acid were dissolved in a solution of 10 cc concentrated ammonium hydroxide and 40 cc distilled water. The solution was well mixed with 93 grams of the 18×30 mesh KA-201 alumina prepared as above. The impregnated material was dried for about 16 hours at 145° C. in a vacuum oven and subsequently calcined in air for about 1 hour at about 400° C.

Similar materials are prepared, for example, using active carbon chips (1 millimeter diameter; a Union Carbide product made via polystyrene polypyrolosis, surface area of about 1200 meter squares per gram, or by using silicas spheres (Davison; grade 57, surface area of about 300 $m^2$/g).

Samples of the molybdenum impregnated aluminum materials prepared above with molybdenum concentrations ranging from 22 to 25% by weight were subjected to a hydrogen treatment at 600° C. for 24 hours and then subjected to a carbiding atmosphere comprising 90% by volume of argon, 8% by volume of hydrogen and 2% by volume of methane for 24 hours at various temperatures. Results are shown in Table 1 below.

TABLE 1

| Carbiding of Molybdenate on $Al_2O_3$ (SA = 256 $m^2$/g) | | |
|---|---|---|
| $Ar/H_2/CH_4$ 90:8:2 600° C., 24 hrs | $Ar/H_2/CH_4$ 90:8:2 700° C., 24 hrs | $Ar/H_2/CH_4$ 90:8:2 800° C., 24 hrs |
| ↓ | ↓ | ↓ |
| MAY CONTAIN SOME $Mo_2C$ LOW CRYSTALLINITY (X-RAY) Anal. $Mo_{2.2}C$ S.A. = 166 $M^2$/g | CONTAINS $Mo_2C$ LOW CRYSTALLINITY (X-RAY) Anal. $MoC_{1.4}$ S.A. = 152 $m^2$/g COKE PRESENT | $MO_2C$ FORMED FAIRLY CRYSTALLINE (X-RAY) Anal. $MoC_{5.2}$ S.A. = 129 $m^2$/g CONSIDERABLE COKE |
| $Ar/H_2/CH_4$ 90:8:2 900° C., 24 hrs | $Ar/H_2/CH_4$ 90:8:2 1000° C., 24 hrs | |
| ↓ | ↓ | |
| WELL DEFINED $Mo_2C$ (X-RAY) Anal. $MoC_{5.2}$ S.A. = 96 $m^2$/g CONSIDERABLE COKE | WELL DEFINED $Mo_2C$ (X-RAY) Anal. $MoC_{4.1}$ S.A. = 65 $m^2$/g CONSIDERABLE COKE | |

As can be seen from the above table a small amount of $Mo_2C$ may have been formed at 600° C. At 700° C., most of the molybdenate had been converted to the carbide and the surface area of the resultant product still contained more than half of the original surface area, although some coke was present in the material. At 800° C. and higher surface area was considerably reduced and considerable coke was present. Small amounts of coke, such as that present in the 700° C. sample, can be removed by a post hydrogen treatment. Large amounts of cokes such as is present in the higher temperature ranges seriously degrade the properties of the catalyst.

Similar materials are prepared using ethane, propane, ethylene, propylene and/or carbon monoxide as the carbiding component.

Methanation

Methanation catalysts that can tolerate severe operating temperatures are needed for more efficient production of high BTU pipeline gas. The catalysts prepared by the instant invention are thermally very stable and have been found to be useful for the conversion of synthesis gas to methane.

Two samples of the molybdenate impregnated aluminas prepared as above were converted to molybdenum carbide and, for comparison purposes, molybdenum metal supported on alumina according to the flow diagrams of Charts 1 and 2.

CHART 1

PREPARATION OF Mo°/Al₂O₃ and Mo₂C/Al₂O₃ Catalysts

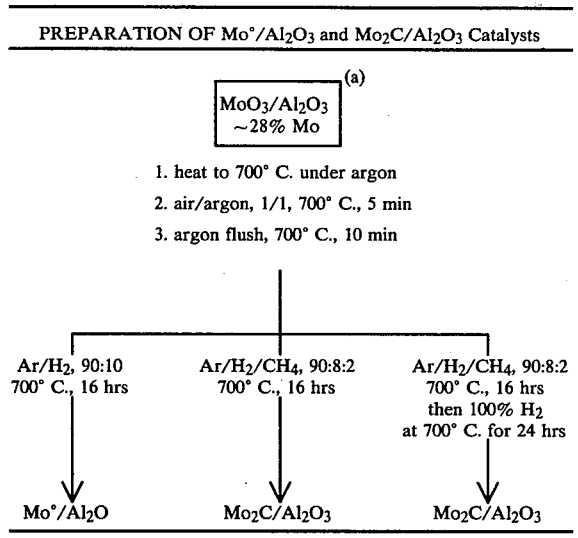

(a) Calcined ammonium metamolybdate/Al₂O₃, which likely contains Al₂(MO₄)₃/Al₂O₃; MoO₃/Al₂O₃ is used as a simplified abbreviation.

CHART 2

CATALYSTS WITH A RELATIVELY LOW METAL LOADING

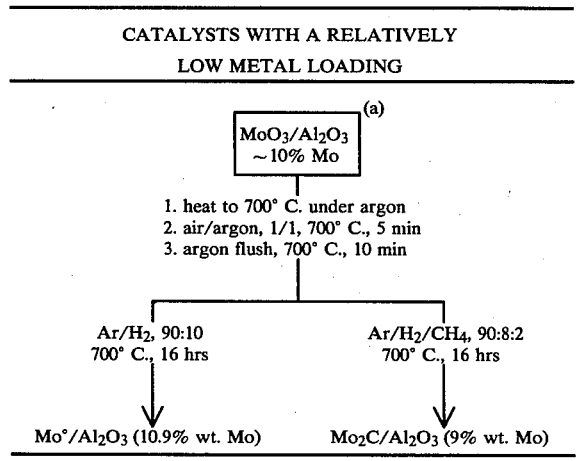

(a) See Chart 1

The alumina supported molybdenum carbide and comparative alumina supported molybdenum metal catalysts were charged to a methanation reactor and a gaseous feed comprising three parts hydrogen to one part of carbon monoxide was fed to the reactor at either 400° C. or 600° C. at a gaseous hourly space velocity of either 1000 or 9000. The results are shown in Table 2.

TABLE 2

Mo₂C/Al₂O₃ and Mo°/Al₂O₃ CATALYSTS: METHANATION
GAS FEED: 3:1 H₂/CO MIXTURE
CATALYST: 3 g or 3 cc

| Catalyst | Temp °C. | GHSV[a] | $\frac{CH_4}{CO + CH_4} \times 100$[b] |
|---|---|---|---|
| Mo°/Al₂O₃ (28% wt Mo) (from Chart 1) | 400 | 1000 | 1.8 |
|  | 400 | 9000 | 0 |
|  | 600 | 1000 | 24 |
|  | 600 | 9000 | 16 |
| Mo₂C/Al₂O₃ (28% wt Mo) (from Chart 1) | 400 | 1000 | 24 |
|  | 400 | 9000 | 5 |
|  | 600 | 1000 | 35 |
|  | 600 | 9000 | 17 |
| Mo°/Al₂O₃ (10.9% wt Mo) (from Chart 2) | 400 | 1000 | 10 |
|  | 400 | 900 | 0.8 |
|  | 600 | 1000 | 20 |
|  | 600 | 9000 | 9 |
| Mo₂C/Al₂O₃ (9% wt Mo) (from Chart 2) | 400 | 1000 | 28 |
|  | 400 | 9000 | 6 |
|  | 600 | 1000 | 19 |
|  | 600 | 9000 | 7 |

[a]S.T.P. cc of gas feed/cc catalyst/hr
[b]Approximate conversion of CO to CH₄. Minor conversion of CO to CO₂ was ignored.

As can be seen from results above, the alumina supported molybdenum carbide is an active catalyst for methanation. A comparison of the alumina supported molybdenum carbide with alumina supported molybdenum metal shows that the carbide and catalyst is superior to the metal, particularly when the metal loading is high. This is readily seen by comparison of the respective conversion levels for the metal and the carbide catalyst under various conditions.

What is claimed is:

1. A process for preparing a supported molybdenum carbide composition which comprises impregnating a porous, inert support with a solution of molybdic acid dissolved in aqueous ammonium hydroxide, heating the impregnated support in order to dry said support and subsequently heating the impregnated support to a temperature ranging from about 650° C. to about 750° C. in a carbiding gas mixture which comprises hydrogen in a concentration ranging from about 1 to about 20 percent by volume, a carbiding component selected from the group consisting of lower alkane, lower alkene, carbon monoxide and mixtures thereof in a concentration ranging from about 0.5 to about 5 percent by volume and the balance being a noble gas.

2. The process of claim 1 wherein, prior to heating the impregnated support in the carbiding gas mixture, the impregnated support is calcined at temperatures ranging up to about 700° C.

3. The process of claim 1 wherein the alkane and/or alkene is selected from the group consisting of methane, ethane, propane, ethylene, and propylene.

4. The process of claim 3 wherein the alkane is methane.

* * * * *